United States Patent
Ohlsson et al.

(10) Patent No.: US 8,371,609 B2
(45) Date of Patent: Feb. 12, 2013

(54) AIRBAG CONFIGURATION FOR A VEHICLE SEAT AND VEHICLE SEAT HAVING THE AIRBAG CONFIGURATION

(75) Inventors: Gunnar Ohlsson, Trollhättan (SE); Henrik Svanberg, Vänersborg (SE); Maria Bowallius, Trollhättan (SE)

(73) Assignee: GM Global Technology Operations LLC, Detroit, MI (US)

( * ) Notice: Subject to any disclaimer, the term of this patent is extended or adjusted under 35 U.S.C. 154(b) by 222 days.

(21) Appl. No.: 12/568,340

(22) Filed: Sep. 28, 2009

(65) Prior Publication Data

US 2010/0084840 A1  Apr. 8, 2010

(30) Foreign Application Priority Data

Sep. 29, 2008  (DE) .................. 10 2008 049 505

(51) Int. Cl.
 *B60R 21/207* (2006.01)
 *B60R 21/215* (2011.01)
 *B60R 21/216* (2011.01)
 *B60R 21/2165* (2011.01)
(52) U.S. Cl. .................. 280/728.3; 280/730.2
(58) Field of Classification Search ............. 280/730.2, 280/728.3; *B60R 21/207, 21/215, 21/216, B60R 21/2165*
See application file for complete search history.

(56) References Cited

U.S. PATENT DOCUMENTS

| | | | |
|---|---|---|---|
| 5,678,853 A | | 10/1997 | Maly |
| 5,860,673 A | * | 1/1999 | Hasegawa et al. ......... 280/730.2 |
| 6,045,151 A | * | 4/2000 | Wu ........................... 280/728.3 |
| 6,206,410 B1 | * | 3/2001 | Brown ....................... 280/728.3 |
| 6,224,092 B1 | * | 5/2001 | Sakamoto et al. ......... 280/730.2 |
| 7,004,496 B2 | * | 2/2006 | Bossecker et al. ......... 280/730.2 |
| 7,125,037 B2 | * | 10/2006 | Tallerico et al. ........... 280/728.2 |
| 7,134,685 B2 | * | 11/2006 | Panagos et al. ............ 280/730.2 |
| 7,178,826 B2 | * | 2/2007 | Acker et al. ............... 280/730.2 |
| 7,322,597 B2 | * | 1/2008 | Tracht ........................ 280/728.3 |
| 7,334,811 B2 | * | 2/2008 | Tracht et al. ............... 280/728.3 |

(Continued)

FOREIGN PATENT DOCUMENTS

| | | |
|---|---|---|
| DE | 20201868 U1 | 6/2002 |
| DE | 102004044256 A1 | 3/2006 |

(Continued)

OTHER PUBLICATIONS

German Patent Office, British Search Report for British Application No. 0916697.6, Dec. 24, 2009.

(Continued)

*Primary Examiner* — Paul N Dickson
*Assistant Examiner* — Joselynn Y Sliteris
(74) *Attorney, Agent, or Firm* — Ingrassia Fisher & Lorenz, P.C.

(57) ABSTRACT

An airbag configuration is provided for a vehicle seat having an airbag that can be expanded by a gas upon the activation. The airbag configuration is covered by a cover that covers the airbag relative to the surroundings in the inactivated state, the cover having a target weakened area that is implemented to open the cover upon the activation and permit the airbag to expand into the surroundings, and having a connector, the connector connected to the cover in the target weakened area, the connector being fastened in a fastening area to the airbag.

19 Claims, 3 Drawing Sheets

U.S. PATENT DOCUMENTS

| | | | |
|---|---|---|---|
| 7,341,275 B2 * | 3/2008 | Miyake et al. | 280/730.2 |
| 7,458,603 B2 * | 12/2008 | Buono et al. | 280/728.2 |
| 7,543,847 B2 | 6/2009 | Tracht | |
| 7,621,557 B2 * | 11/2009 | Tracht et al. | 280/728.2 |
| 7,669,889 B1 * | 3/2010 | Gorman et al. | 280/730.2 |
| 7,677,596 B2 * | 3/2010 | Castro et al. | 280/730.2 |
| 7,731,226 B2 * | 6/2010 | Zink | 280/730.2 |
| 7,770,918 B2 | 8/2010 | Berntsson et al. | |
| 2003/0184057 A1 * | 10/2003 | Kumagai | 280/728.3 |
| 2004/0130130 A1 | 7/2004 | Bossecker et al. | |
| 2006/0113769 A1 | 6/2006 | Tracht | |
| 2007/0164541 A1 | 7/2007 | Soderquist et al. | |

FOREIGN PATENT DOCUMENTS

| | | |
|---|---|---|
| DE | 112004001981 T5 | 9/2006 |
| DE | 102007042130 A1 | 3/2009 |
| DE | 102007061879 A1 | 6/2009 |
| EP | 1657126 A2 | 5/2006 |
| EP | 1794037 A1 | 6/2007 |
| FR | 2919838 A1 | 2/2009 |
| WO | 2006094638 A1 | 9/2006 |

OTHER PUBLICATIONS

German Patent Office, German Search Report for Application No. 102008049505.0, dated Sep. 29, 2008.

UK IPO, British Examination Report for Application No. 0916697.6, dated Feb. 28, 2012.

Chinese Patent Office, Chinese Office Action for Application No. 200910179168.2, dated Jun. 21, 2012.

* cited by examiner

AIRBAG CONFIGURATION FOR A VEHICLE SEAT AND VEHICLE SEAT HAVING THE AIRBAG CONFIGURATION

CROSS-REFERENCE TO RELATED APPLICATION

This application claims priority to German Patent Application No. 102008049505.0, filed Sep. 29, 2008, which is incorporated herein by reference in its entirety.

TECHNICAL FIELD

The invention relates to an airbag configuration for a vehicle seat having an airbag which can be expanded by a gas upon activation, having a cover, which covers the airbag relative to the surroundings in the inactivated state, the cover having a target weakened area, which is implemented and/or situated in order to open the cover upon the activation and permit the airbag to expand into the surroundings upon the opening, and having a connector, the connector being connected to the cover in the target weakened area. The invention also relates to a vehicle seat having the airbag configuration.

BACKGROUND

Airbags and vehicles are used for increasing the driving safety of the occupants and are typically designed so that they are expanded at high velocity in the event of an accident, in order to form a soft cushion between the surroundings and the vehicle occupants. While emphasis was placed on the driver airbag or passenger airbag as the frontal airbag upon the introduction of airbags, manifold further areas of application have become known in the meantime. For example, airbags are also used as side impact protection units, the airbag being extended between the vehicle occupant and a side wall of the vehicle, in order to reduce accident consequences of laterally colliding vehicles or of rollovers of one's own vehicle. Airbags of this type for a side impact protection unit are often integrated in the vehicle seat of the vehicle, because in this form of integration the airbag is carried along with the vehicle seat when the seat is displaced to set the distance between driver and steering wheel or also to set the footwell size in the vehicle longitudinal direction.

An airbag of this type is disclosed, for example, in U.S. Pat. No. 5,678,853. This publication describes an airbag system, the gas generator and the airbag being situated in the side area of the vehicle seat. Upon an expansion of the airbag, a seam is opened as the target weakened area and the airbag can expand at the predetermined position. In order to support the opening of the seam, the airbag and the gas generator are situated in a type of envelope, which is fixed in the vehicle seat at a position opposite to the seam. The envelope cannot yield unpredictably upon the expansion of the airbag due to the fixing, so that the expansion precision is increased.

US 2004/0130130 A1 describes a similar system, an envelope of the airbag being sewn on both sides to the covering of the vehicle seat, so that upon an expansion of the airbag, firstly the envelope is pressed apart and thus also the seam is opened in order to allow the airbag to expand outward.

EP 1657126 A2, which forms the closest prior art, also describes an airbag configuration for a vehicle seat, in this embodiment, a strip being sewn in the area of the seam of the vehicle seat, which is connected on the opposite side to the fixed structure of the vehicle seat. Upon an expansion of the airbag, the strip prevents elastic yielding of the seam outward and is instead used as a type of tear strip, which opens the seam in order to permit the airbag to expand outward.

The invention is based at least one object of proposing an airbag configuration for a vehicle seat and a corresponding vehicle seat, which allow a high level of expansion kinematics of the airbag.

SUMMARY

The embodiments of the invention relate to an airbag configuration which is suitable and/or implemented for a vehicle seat. The vehicle seat is preferably situated in a motor vehicle, but can be positioned in any arbitrary vehicle, and the use of the airbag configuration according to the invention is thus also conceivable in aircraft, ships, and the like.

The airbag configuration has at least one airbag, which can be expanded by a gas upon activation. A gas generator is typically used for the activation, which drives gas development via a pyrotechnic primer, for example. In an altered embodiment, the airbag configuration can also have multiple airbags, which are situated directly adjacent to one another or spaced apart from one another.

The airbag configuration comprises a cover, which covers the airbag relative to the surroundings in the inactivated state. The cover is preferably implemented as a covering for the vehicle seat (i.e., it has at least one layer made of leather, artificial leather, plastic, textile, or the like), which is implemented in particular as a decorative layer. The cover can also have further layers, such as foam for cushioning.

The cover displays a target weakened area, which is implemented and/or situated to open the cover upon the activation and permit the airbag to expand into the surroundings. The target weakened area is converted into an opening area upon the activation, through which the airbag can exit as intended.

A connector is provided in the airbag configuration, the connector being connected to the cover in the target weakened area. The connector is particularly situated so that traction forces may be transmitted to the target weakened area.

In the scope of the embodiments of the invention it is proposed that the connector is fastened to the airbag in a fastening area. A connection is thus provided between airbag and the target weakened area, which is particularly implemented to convert the target weakened area into the opening area upon an expansion of the airbag.

It is a consideration that the connector is to trigger opening or tearing open of the target weakened area or is at least to support it, the connector working like a tear strip in particular. The traction forces are preferably introduced into the connector directly by the airbag itself and transmitted from the connector into the target weakened area, in order to open it and/or tear it open.

One advantage is thus that it is possible through this construction to allow very early opening of the target weakened area and thus increase the expansion velocity of the airbag. In particular, the conversion of the target weakened area into the opening area occurs in an early phase or with the expansion of the airbag.

Specifically, it was established that, for example, in an embodiment as a side impact protection unit, the reaction times are very low in comparison to front airbags and may be less than 10 ms. It is therefore important in particular, but not restricted thereto, to improve the expansion kinematics in airbag configurations implemented as side impact protection units. Through the support of the connector upon opening and/or tearing open of the target weakened area, the airbag configuration is prepared at a very early time, so that the airbag can expand into the surroundings unobstructed.

The target weakened area can fundamentally be implemented arbitrarily. However, it is preferable if it is implemented as a seam, because it can be integrated particularly elegantly in a vehicle seat. The seam has a stitch spacing of greater than 5 mm with a thread of 40/80, for example. However, it is also possible that the target weakened area is implemented by a glued joint, mechanical clamp, or similar feature. The connector can be implemented in a simple embodiment as a seam and/or glued joint, which particularly connects the airbag directly to the cover in the target weakened area.

In a preferred embodiment of the invention, the connector is fastened to the seam on an edge area of the cover. For example, the cover is folded over in the edge area (i.e., implemented as double-layered), the connector being situated in this double-layered area.

In principle, the connector can be attached at points or in sections. In one possible embodiment, it is preferable if the connector extends over a wide area of the target weakened area, in particular the seam. The connector particularly preferably extends over the entire width of the inactivated airbag along the target weakened area and/or the seam.

In another possible embodiment, the connector is implemented as a plurality (e.g., 3, 4, or 5, of tabs which are situated distributed over the longitudinal extension of the airbag in the inactivated state). This embodiment has the advantage that the forces to be transmitted for opening the target weakened area are controllable by the distribution, length, and/or width of the tabs.

In a refinement of embodiments of the invention, a protective envelope is provided, which at least sectionally or completely encloses the airbag protectively in the inactivated state. The protective envelope can comprise a flexible and/or limp material, such as a fabric or film, in particular made of plastic. Alternatively there too, the protective envelope is implemented as stiff and is made of plastic, in particular thermoplastic, for example. The manufacturing of the protective envelope can be performed, for example, by blow molding or vacuum molding, in order to form a very light and nonetheless dimensionally stable protective envelope. In this refinement, it is preferably provided that the protective envelope has through openings, through which the connector and/or the tabs extend.

In an advantageous embodiment, the connector has target disconnection points, so that the connection between airbag and cover is disconnected after the activation of the airbag and after the opening of the cover and/or the target weakened area and the airbag can expand independently from the connector thereafter.

In a preferred embodiment of the invention, the connector is implemented from a flexible or limp material, which still has tensile strength, however. For example, a material similar to the material of safety belts can be used. However, it is also possible to use films, nets, or another planar material (e.g., made of plastic).

In a particularly preferred embodiment of the invention, the connector is implemented as a textile material, in particular as a fabric. A textile material has the advantage that it can be sewn to both the airbag and also the cover, without the initiation of cracks being a concern. In addition, a textile material has the advantage that sufficient tensile strength for opening the target weakened area remains even in the event of local damage.

In principle, it is also possible that the airbag is fastened directly on the cover, the connector being implemented as a common seam, glued joint, or another connection. In a preferred refinement of the invention, however, the connector is implemented separately from the airbag and fastened to the airbag using a seam in the fastening area, for example. For example, the connector can already be fastened and/or sewn on during the sewing together of the airbag in the manufacturing.

With the goal of achieving the most effective possible opening and/or tearing open of the target weakened area, it is preferable for the fastening area to be situated in a body area of the airbag. Through the selection of the position of the fastening area in an area close to the gas generator, tensile forces are already transmitted to the connector at a very early stage through the expansion of the body area of the airbag, which is filled first upon the activation.

In an advantageous refinement of the connection, the fastening area is situated at a position on the airbag which is also positioned inside the cover after the expansion. This embodiment reflects the idea once again that the target weakened area is already to be opened upon the expanding of the body area of the airbag within the cover.

In a particularly preferred implementation of the invention, the airbag is rolled up in the inactivated state in a rolled area, the rolled area being connected and/or connectable via a web area to the gas generator. Optionally, the web area merges into the rolled area and/or forms the first layer of the rolled area. In this implementation, the fastening area is situated on the web area. In a refinement of the invention, the fastening area is situated on the side of the web area facing away from the rolled-up airbag. For example, if one views the airbag in a cross-section perpendicular to its longitudinal extension, the web area merges into the rolled area, the fastening section being situated on the outer side of the web and/or rolled area.

In a preferred design implementation, the connector is implemented as a strip, whose width is selected as greater than the height, the width being selected in the longitudinal extension of the target weakened area. The strip preferably extends over the entire width of the airbag. The connector can also comprise multiple individual areas.

A further object of the invention relates to a vehicle seat having an airbag configuration preferably being implemented as a side impact protection configuration.

In the implementation of this object of the invention, it is preferable for the target weakened area to extend in longitudinal extension parallel to the longitudinal extension of the back of the vehicle seat. In particular, the target weakened area is situated in the side face which faces toward the vehicle wall, and/or in a seam between the side face and the rear face for the occupants of the vehicle seat.

With the goal of improving the integration of the airbag in the vehicle seat and/or improving the expansion kinematics, it is preferable if the airbag is integrated in a soft pack and/or a soft protective envelope in the vehicle seat. In this embodiment, a rigid housing is thus intentionally dispensed with. However, an elastic but stiff envelope, such as a plastic tube, which converts into a trough supporting the expansion direction upon opening, is also conceivable.

BRIEF DESCRIPTION OF THE DRAWINGS

The present invention will hereinafter be described in conjunction with the following drawing figures, wherein like numerals denote like elements, and.

DETAILED DESCRIPTION

Figure 1:
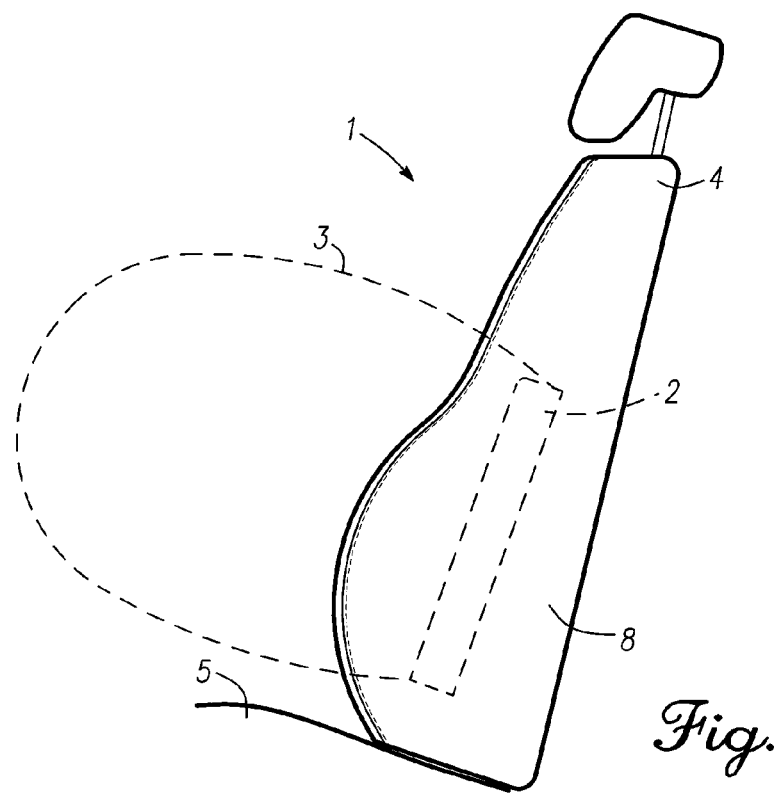
FIG. 1 shows a schematic top view of a vehicle seat having integrated airbag configuration as an exemplary embodiment of the invention.

FIG. 1 shows a very schematic illustration of a vehicle seat 1 in a vehicle (not shown) having an integrated airbag configuration 2 as an exemplary embodiment of the invention, which is implemented as a side impact protection unit. In the event of an accident, the airbag configuration 2 is triggered, so that an airbag 3, as indicated by the dashed lines, extends from a backrest 4 up into the area of the seat surface 5. The side on which the airbag configuration 2 is integrated in the vehicle seat 1 faces toward the automobile outer side.

Figure 2:
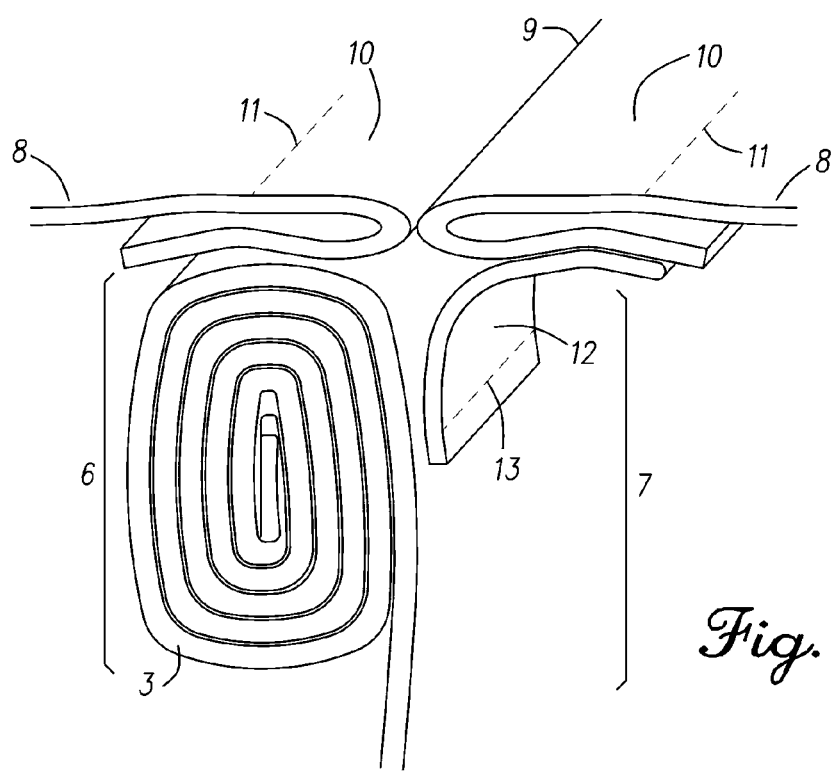
FIG. 2 shows a schematic three-dimensional side view through the airbag configuration in FIG. 1.

FIG. 2 shows a schematic sectional view through the airbag configuration 2 perpendicular to the longitudinal extension of the airbag configuration 2 in a three-dimensional illustration. The airbag 3 is shown in a rolled-up state in FIG. 2, so that a rolled section 6 and a web section 7 result, via which the rolled section 6 is connected to a gas generator (not shown). In other embodiments, the airbag 3 can also be folded or collapsed in another way in the area of the rolled section 6.

A cover 8 of the vehicle seat 1 is shown on the top side, which is formed from a cover material, in particular a decorative material. For example, leather, artificial leather, textiles, or plastic is used as the cover 8. In an imaginary extension to the web section 7, the cover 8 has a target weakened area in the form of a seam 9. The seam 9 is implemented as the target break point upon the activation of the airbag 3 and is formed, for example, by a thread having an enlarged stitch spacing of greater than 5 mm. In particular, the tensile strength of the seam 9 is less than 40% of the tensile strength of the cover 8.

The seam 9 runs in the same direction as the longitudinal direction of the back rest 4 and/or the longitudinal extension of the rolled-up airbag 3. Edge areas 10 of the cover 8 are formed on both sides of the seam 9 by folding over the cover 8 and sewing it with auxiliary seams 11.

Upon an activation of the airbag 3, the seam 9 is opened and/or torn, the edge areas 10 being pulled apart and the airbag 3 reaching the outside through the resulting opening in order to unfold.

In order to simplify the opening and/or tearing of the seam 9, one or more connectors in the form of tabs 12 are provided. The tabs 12 are connected on one side to one of the edge areas 10 via the auxiliary seam 11 or a further seam and/or a glue joint or the like and are sewn on the other side via a further auxiliary seam 13 in a fastening area to the web section 7 of the airbag 3 and thus sewn directly to the airbag 3. In altered embodiments, multiple tabs 12 or one tab 12 extending over the entire width of the airbag 3 in the longitudinal extension of the seam 9 are provided. The tabs 12 are formed from an artificial fabric, for example.

Figure 3:
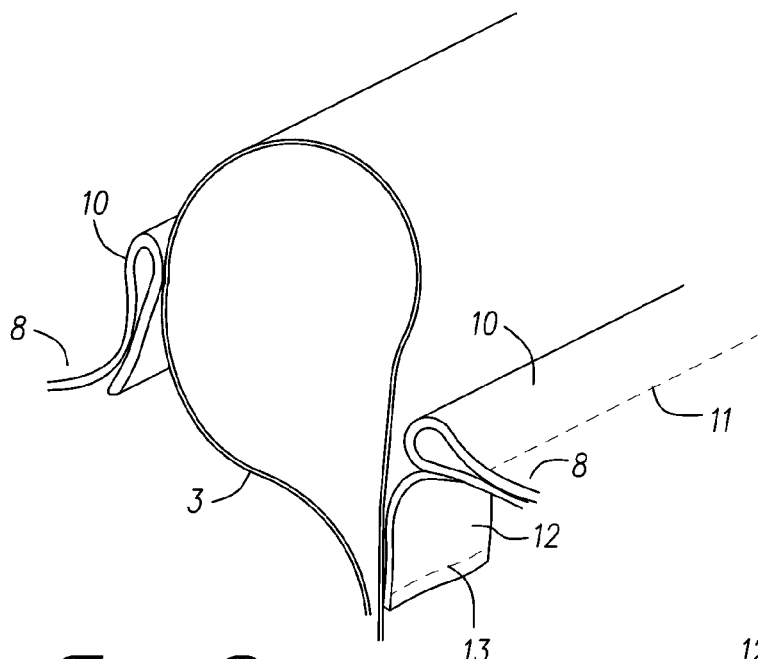
FIG. 3 shows the airbag configuration in the activated state of the airbag in the same illustration as FIG. 2.

As results in particular when considering FIG. 2 and FIG. 3 together, the right edge area 10 is fixed by the tab 12 and/or impinged with a tensile stress upon an expansion of the airbag 3, so that the seam 9 is torn open in a very early stage. Upon the further expansion of the airbag 3, the left edge area 10 is pressed to the side, the airbag 3 expanding directed outward. It is to be noted that the attachment area of the auxiliary seam 13 is also still located inside the cover 8 after the expansion of the airbag 3.

In order to further reinforce the effect of the early tearing open of the seam 9, the rolled section 6 is situated below the left edge area 10. Upon an expansion of the airbag 3, the web section 7 is displaced to the left, so that a tensile stress is transmitted via the tab 12 to the left edge area 10, in order to support the opening of the seam 9.

Figure 4A:
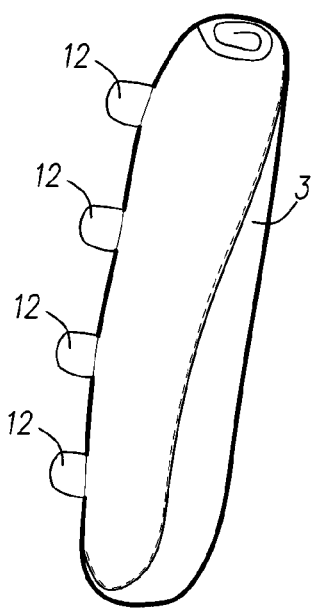
FIGS. 4a, b show a three-dimensional top view of an airbag and an airbag configuration in a similar illustration as in FIG. 2 as a second exemplary embodiment of the invention.
Figure 4B:
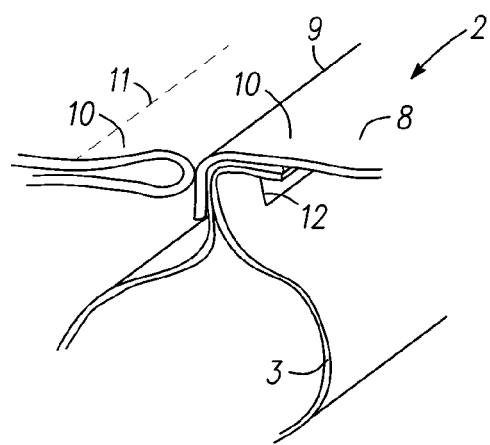

FIG. 4a shows a three-dimensional side view of an airbag 3 in the inactivated state as a second exemplary embodiment of the invention. FIG. 4b shows the airbag 3 of FIG. 4a in the installed state in the airbag configuration 2. In comparison to the first exemplary embodiment, the airbag 3 of the second exemplary embodiment is not rolled, but rather folded or stowed in another space-saving way. The airbag 3 has four tabs 12, which are spaced apart from one another regularly and sewn onto the airbag 3 or fastened in another way. The tabs 12 are fastened on one of the edge areas 10, e.g., glued or sewn on. The tabs 12 assume the same or a similar function as the tabs 12 in FIG. 2 and FIG. 3.

Figure 5A:
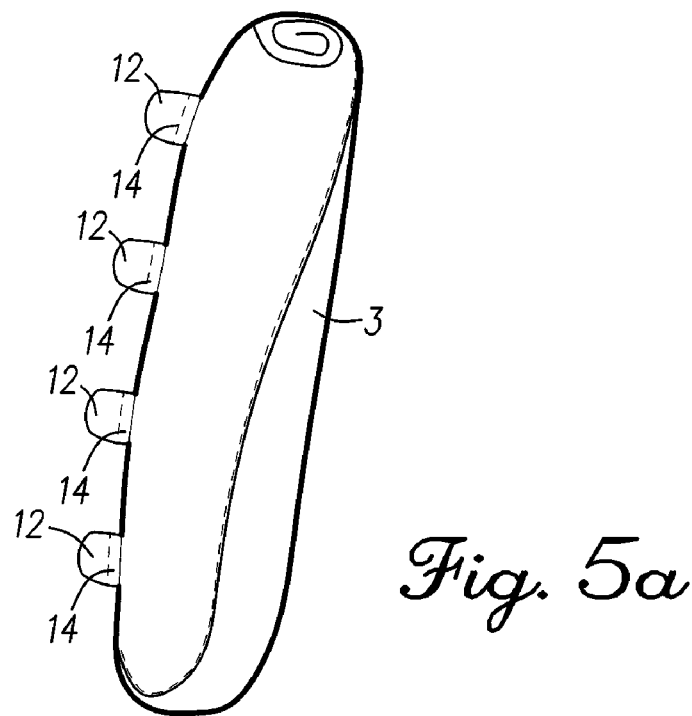
FIGS. 5a, b show a third exemplary embodiment of the invention in a similar illustration as FIGS. 4a, b.
Figure 5B:
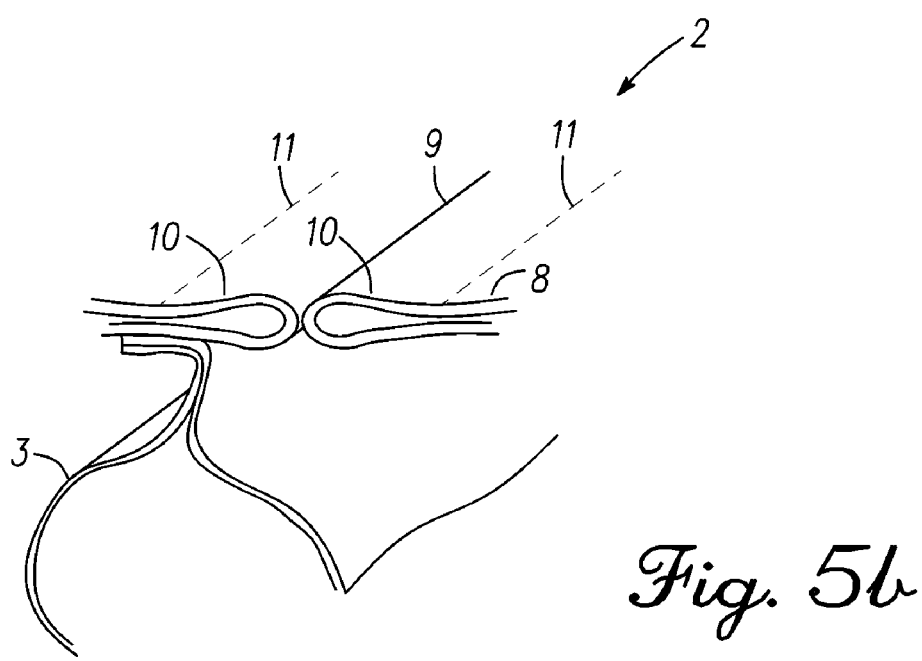

FIG. 5a and FIG. 5b show a third exemplary embodiment of the invention in the same illustration as in FIG. 4a and FIG. 4b. In contrast to the second exemplary embodiment, the tabs 12 are fastened on the left edge area 10 and optionally via the auxiliary seam 11, which also fixes the folded-over edge area as a decorative seam. Furthermore, the tabs 12 have target disconnection points 14, which are situated transversely to the longitudinal extension of the tabs 12 in the full width of the tabs 12. The target disconnection points 14 are implemented so that upon the activation of the airbag 3, the seam 9 is first disconnected and/or torn open by the tabs 12. Subsequently, upon the further expansion of the airbag 3, the tabs 12 are disconnected at the target disconnection points, so that the airbag 3 can unfold independently of the tabs 12.

Instead of the target disconnection points 14, other means may be provided which cancel out the connection between the cover 8 and the airbag 3 after the opening of the target weakened area. For example, the tabs 12 may be fastened on the airbag via seams which can be torn off or the fastening of the tabs 12 on the cover 8 is torn off.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. An airbag configuration for a vehicle seat, comprising:
an airbag that can be expanded from an inactivated state to an inflated state by a gas upon an activation;
a cover that covers the airbag relative to surroundings in the inactivated state,
the cover having a first portion and a second portion, the cover having a target weakened area at a junction of the first portion and the second portion that is implemented in order to open the cover upon the activation and permit the airbag to expand into the surroundings in the inflated state; and
a connector coupled to the first portion of the cover adjacent the target weakened area and directly fastened to the airbag in a fastening area to hold the first portion of the cover while the second portion of the cover is opened during expansion of the airbag from the inactivated state to the inflated state.

2. The airbag configuration according to claim 1, wherein the target weakened area is implemented as a seam.

3. The airbag configuration according to claim 1, wherein the connector is covered by the cover relative to surroundings in the inflated state.

4. The airbag configuration according to claim 1, wherein the connector is coupled to the first portion of the cover by a seam.

5. The airbag configuration according to claim 4, wherein the connector is is fastened to the airbag by a seam.

6. The airbag configuration according to claim 1, wherein the connector is fastened to the first portion of the cover on an edge area of the cover.

7. The airbag configuration according to claim 1, wherein the target weakened area is implemented as a seam, wherein the cover has a cover tensile strength, wherein the seam has a seam tensile strength, and wherein the seam tensile strength is less than 40% of the cover tensile strength.

8. The airbag configuration according to claim 1,
wherein the airbag has a web portion and a rolled portion, and wherein the connector is fastened to the web portion of the airbag using a seam in the fastening area.

9. The airbag configuration according to claim 1, wherein the connector comprises at least one tab.

10. The airbag configuration according to claim 1, wherein the target weakened area is formed b a first seam connecting the first portion of the cover and the second portion of the cover, wherein the connector is coupled to the first portion of the cover with a second seam, wherein the connector is fastened to the airbag with a third seam, wherein the first seam is configured to be opened during expansion of the airbag from the inactivated state to the inflated state, and wherein the second seam and the third seam are configured to remain unopened during expansion of the airbag from the inactivated state to the inflated state.

11. The airbag configuration according to claim 1, wherein the connector comprises a target disconnection point implemented to disconnect upon the activation of the airbag after an opening of the target weakened area.

12. An airbag configuration for a vehicle seat, comprising:
an airbag configured to be expanded from an inactivated state to an inflated state;
a first portion of a cover anchored to the airbag in the inactivated state and in the inflated state;
a second portion of a cover connected to the first portion of the cover along a weakened junction, wherein the weakened junction opens upon expansion of the airbag from the inactivated state to the inflated state to permit the airbag to expand beyond the portions of the cover into surroundings in the inflated state one end of a connector directly anchored to the airbag in the inactivated state and in the inflated state and another end of the connector coupled to the first portion of the cover adjacent the weakened junction.

13. The airbag configuration according to claim 12, wherein the weakened junction is formed by a seam, wherein the first portion of the cover and the second portion of the cover each have a cover tensile strength, wherein the seam has a seam tensile strength, and wherein the seam tensile strength is less than 40% of the cover tensile strength.

14. The airbag configuration according to claim 12, wherein a section of the airbag is rolled up in the inactivated state.

15. The airbag configuration according to claim 14, wherein the rolled-up section is situated under the second portion of the cover in the inactivated state and the connector is situated under the first portion of the cover in the inactivated state and in the inflated state.

16. The airbag configuration according to claim 12, wherein the weakened junction is oriented parallel to a longitudinal extension of a backrest of the vehicle seat.

17. The airbag configuration according to claim 12, wherein the airbag includes a web section and a rolled section, wherein the connector is directly anchored to the web section of the airbag, and wherein the rolled section expands into the second portion of the cover during expansion of the airbag from the inactivated state to the inflated state.

18. A vehicle seat, comprising:
an airbag that can be expanded by a gas upon an activation;
a cover that covers the airbag relative to surroundings in an inactivated state, the cover having a target weakened area formed at a junction of a first cover portion and a second cover portion that is implemented in order to open the second cover portion upon the activation and permit the airbag to expand into the surroundings; and
a connector coupled to the first portion of the cover adjacent the target weakened area and directly fastened to the airbag in a fastening area to hold the first portion of the cover substantially stationary during expansion of the airbag from the inactivated state to an inflated state.

19. The vehicle seat of claim 18, wherein the cover has a cover tensile strength, wherein the weakened junction has a junction tensile strength, and wherein the junction tensile strength is less than 40% of the cover tensile strength.

* * * * *